(12) United States Patent
Klearman

(10) Patent No.: US 9,959,568 B2
(45) Date of Patent: May 1, 2018

(54) MULTI-NODE CUSTOMER ENGAGEMENT AND ORDERING SYSTEM WITH MOBILE PAYMENT INTEGRATION

(71) Applicant: America's Drive-In Brand Properties, LLC, Oklahoma City, OK (US)

(72) Inventor: William I. Klearman, Edmond, OK (US)

(73) Assignee: America's Drive-In Brand Properties, LLC, Oklahoma City, OK (US)

( * ) Notice: Subject to any disclaimer, the term of this patent is extended or adjusted under 35 U.S.C. 154(b) by 125 days.

(21) Appl. No.: 14/046,910

(22) Filed: Oct. 4, 2013

(65) Prior Publication Data
US 2014/0100971 A1 Apr. 10, 2014

Related U.S. Application Data

(60) Provisional application No. 61/710,361, filed on Oct. 5, 2012, provisional application No. 61/879,109, filed on Sep. 17, 2013.

(51) Int. Cl.
*G06Q 50/12* (2012.01)
*G06Q 30/06* (2012.01)
*G06Q 30/02* (2012.01)

(52) U.S. Cl.
CPC ..... *G06Q 30/0641* (2013.01); *G06Q 30/0269* (2013.01); *G06Q 50/12* (2013.01)

(58) Field of Classification Search
None
See application file for complete search history.

(56) References Cited

U.S. PATENT DOCUMENTS

| | | | | |
|---|---|---|---|---|
| 5,696,909 A * | 12/1997 | Wallner | ........... | G06Q 20/00 235/379 |
| 5,966,696 A | 10/1999 | Giraud | | |
| 7,343,006 B2 * | 3/2008 | Klearman | ........... | G06Q 20/04 379/114.19 |
| 2008/0077502 A1 * | 3/2008 | Boyd | ........... | G06O 30/02 705/14.54 |
| 2009/0240598 A1 | 9/2009 | Kargman | | |
| 2009/0259516 A1 * | 10/2009 | Zeevi | ........... | G06Q 30/02 705/14.65 |
| 2011/0153467 A1 * | 6/2011 | Salmen | ........... | G06Q 10/087 705/28 |
| 2011/0251892 A1 | 10/2011 | Laracey | | |

OTHER PUBLICATIONS

International Preliminary Report on Patentability; PCT/US2013/063595, dated Sep. 15, 2014.
International Search Report and Written Opinion; PCT/US2013/063595; dated Feb. 18, 2014.

\* cited by examiner

*Primary Examiner* — Paul Danneman
(74) *Attorney, Agent, or Firm* — Crowe & Dunlevy, P.C.

(57) ABSTRACT

A method for delivering advertising content from a central office to customer interfaces positioned at a plurality of remote local stores includes the steps of storing the advertising content on a content control server at the central office and transmitting the advertising content from the central office to customer interface control servers at each of the plurality of remote local stores. The method further includes the step of transferring the advertising content from the customer interface control servers to each of the customer interfaces. The advertising content is displayed at the customer interface in response to a content trigger sent from the customer interface control server.

14 Claims, 10 Drawing Sheets

MULTI-NODE CUSTOMER ENGAGEMENT AND ORDERING SYSTEM WITH MOBILE PAYMENT INTEGRATION

RELATED APPLICATIONS

This application claims the benefit of U.S. Provisional Patent Application Ser. No. 61/710,361 filed Oct. 5, 2012, entitled "Multi-Node Customer Engagement and Ordering System," and U.S. Provisional Patent Application Ser. No. 61/879,109 filed Sep. 17, 2013, entitled "Multi-Node Customer Engagement and Ordering System with Mobile Device Integration," the disclosures of which are herein incorporated by reference.

FIELD OF THE INVENTION

This invention relates generally to the field of customer ordering systems, and more particularly, but not by limitation, to a novel credit card transaction system for a business having multiple remote customer interfaces.

BACKGROUND OF THE INVENTION

"Drive-in restaurants" are characterized by a practice of selling food in which customers are permitted to order, receive and pay for food without leaving their vehicles. In many cases, a drive-in restaurant will have a number of "stalls" in which customers park their vehicles. Drive-in stalls may include a menu and a method of placing an order to the inside of the restaurant using an intercom or similar device. Once the food is prepared, an employee, often referred to as a "carhop," delivers the food to the customer at the stall. The carhop is often responsible for taking the customer's money, making change if necessary, and registering the money inside the restaurant.

In the past, restaurants have used static menus placed at the stall or in another location. The static menus are typically replaced or updated on a periodic basis. Replacing the static menu content is expensive, time consuming and difficult to update on a frequent basis. There is, therefore, a need for a point-of-order menu that can be updated on a dynamic, real-time basis.

SUMMARY OF THE INVENTION

In preferred embodiments, the present invention includes a method for delivering advertising content from a central office to customer interfaces positioned at a plurality of remote local stores. The method includes the steps of storing the advertising content on a content control server at the central office and transmitting the advertising content from the central office to customer interface control servers at each of the plurality of remote local stores. The method further includes the step of transferring the advertising content from the customer interface control servers to each of the customer interfaces. The advertising content is displayed at the customer interface in response to a content trigger sent from the customer interface control server.

DETAILED DESCRIPTION OF THE PREFERRED EMBODIMENTS

Figure 1:
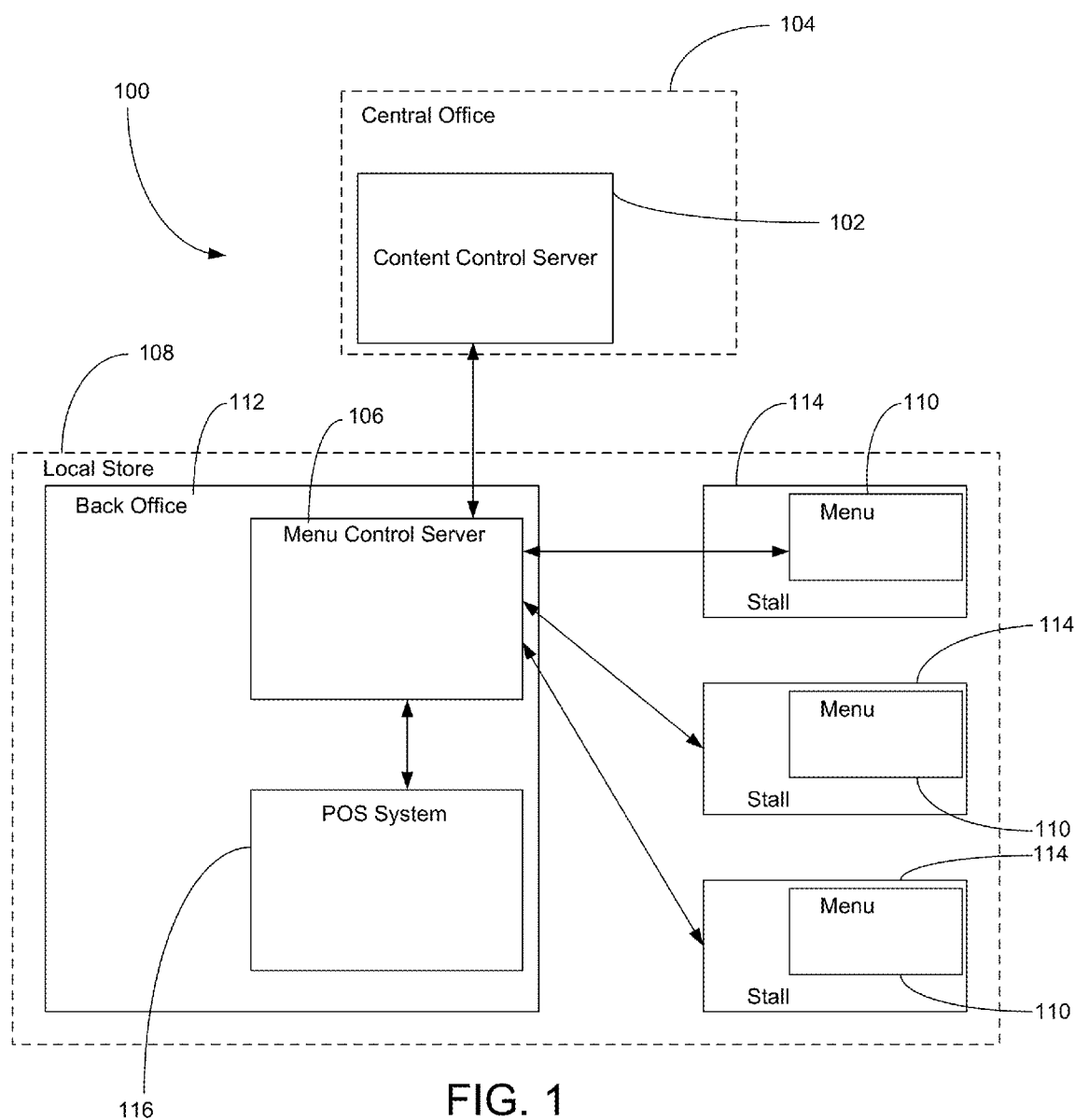
FIG. 1 is a functional diagram of a dynamic menu system configured for deployment at a drive-in restaurant.

Beginning with FIG. 1, shown therein is a diagrammatic representation of a dynamic menu system 100 constructed in accordance with a presently preferred embodiment of the present invention. The dynamic menu system 100 generally includes a content control server 102 located at a central office 104, a customer interface control server 106 located at a local store 108 and one or more customer interfaces 110 located at the local store 108. The dynamic menu system 100 is configured to provide advertising and informational content and sales transaction functionality from the central office 104 to the one or more customer interfaces 110 at the local store 108.

It will be understood that there are preferably a plurality of local stores 108 connected to the central office 104. It will further be understood that there may be two or more central offices 104, depending on the nature of the business and distance between the local stores 108. In the preferred embodiment of a drive-in restaurant, the local store 108 includes a back office 112 and one or more stalls 114 physically located outside the back office 112. In an alternate embodiment that would cover the use of large warehouses or "big-box" stores, the stalls 114 are physically located within the same building as the back office 112. In a particularly preferred embodiment, the local store 108 is a restaurant and the customer interface control service 106 is a menu control server 106.

The back office 112 preferably includes a separate point-of-sale ("POS") system 116 that is used in connection with the operation of a business that includes a central transaction center with one or more linked remote interfaces. Suitable POS systems 116 are disclosed within U.S. Pat. No. 7,343,006, entitled Drive-In Restaurant Credit-Card Transaction System, the disclosure of which is herein incorporated by reference. The POS system 116 is responsible for coordinating orders placed at the stalls 114 with order fulfillment in the back office 112 and conducting credit card transactions. Although the POS system 116 is depicted separately from the menu control server 106, these computer systems can coexist on the same physical hardware. In an alternate preferred embodiment, the menu control server 106 is included as functionality and programming within the POS system 116.

The content control server 102 is connected via the Internet, dedicated transmission line, or VPN tunnel to the menu control server 106 located at the local store 108. In turn, each customer interfaces 110 is in direct data connectivity with the menu control server 106. In this way, content supplied from the menu control server 102 is routed to each of the customer interfaces 110 through the menu control server 106 provisioned in the back office 112 of each of the local stores 108 functionally connected to the central office 104. It will be understood that, as used herein and unless otherwise specified, the term "content" applies to all advertising, transactional and informational content related to the consumer experience at the customer interfaces 110, including, for example, text, sounds, videos, graphics and multimedia presentations.

Figure 2:
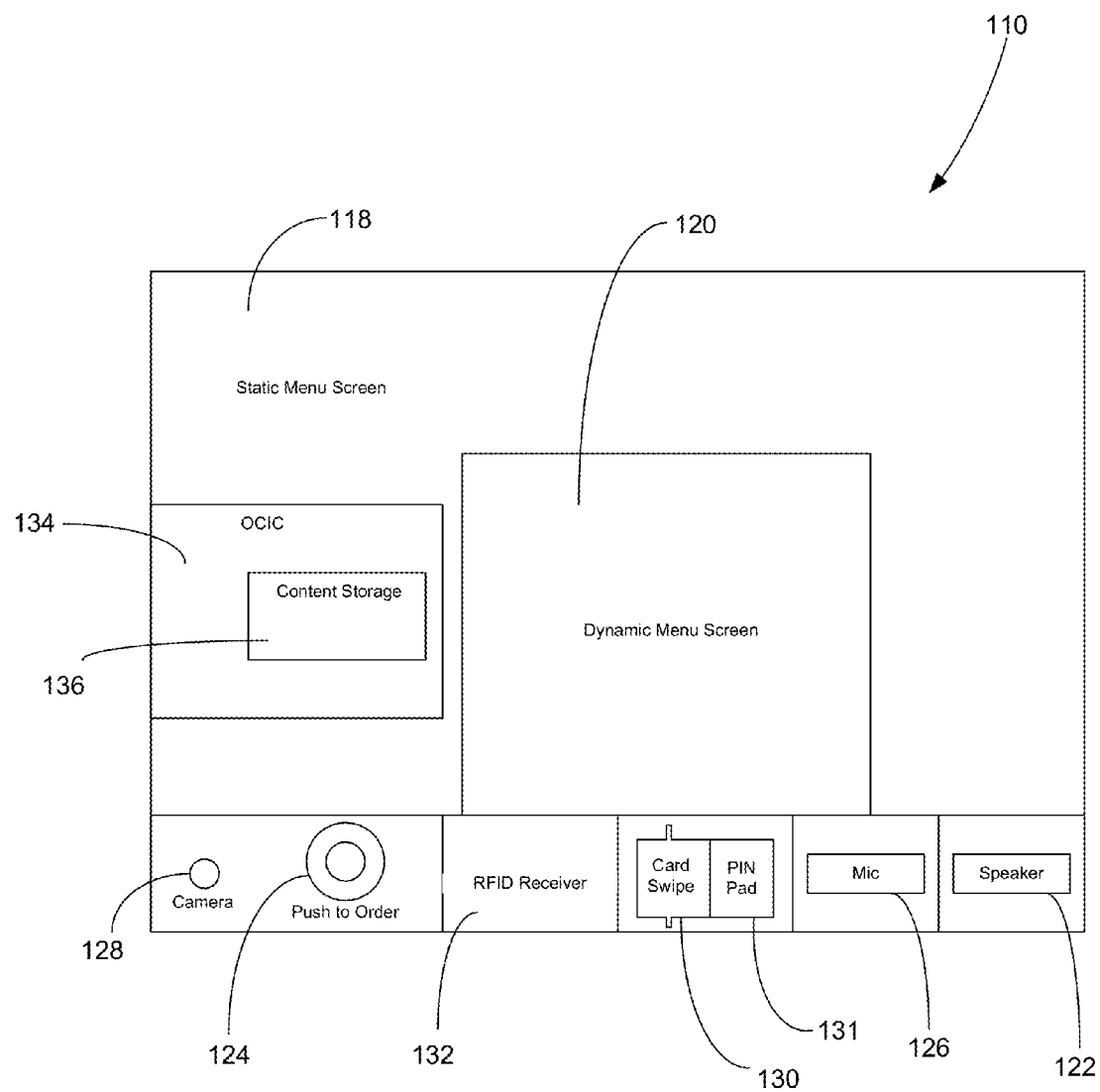
FIG. 2 is a diagrammatic view of an interactive menu from the dynamic menu system of FIG. 1.

Referring now also to FIG. 2, shown therein is a diagrammatic representation of the customer interface 110 constructed in accordance with a presently preferred embodiment in which the customer interface 110 is characterized as a menu assembly. The customer interface 110 preferably includes various input and output modules, including a static menu 118, a dynamic menu screen 120, a speaker 122, a call button 124, a microphone 126, camera 128, a magnetic card swipe module 130, a radio frequency identification (RFID) module 132 and an onboard customer interface computer 134. In the preferred embodiment, the customer interface 110 includes a weatherproof housing (not shown) that permits the placement of the customer interface 110 at the outdoor stall 114.

The static menu 118 includes fixed content that can be periodically replaced with new content. The static menu 118 preferably includes a backlit transparent window to which translucent printed content can be secured. The use of backlit static menus is well known in the art. In a first preferred embodiment, the dynamic menu screen 120 includes a video monitor that is configured to display graphics, text and video content in accordance with prevailing video technology standards. In a second preferred embodiment, the dynamic menu screen 120 includes a touch-sensitive video monitor that is configured to display graphics, text and video content in accordance with prevailing video technology standards, and is capable of receiving input from the user. Suitable infrared touch-sensitive dynamic menu screens 120 are available from E&T Tech Co., LTD of Shenzhen, China.

The call button 124, microphone 126 and speaker 122 can be used to conduct a conversation from the customer interface to the POS system 116 located inside the back office 112. To initiate a conversation, the customer depresses the call button 124, which signals an employee positioned at an order acceptance terminal within the POS system 116. The customer and employee can use the microphone 126 and speaker 122 to place the customer's order, follow-up on the status of the order or modify the order. In a presently preferred embodiment, the speaker 122, microphone 126 and call button 124 are connected to the back office 112 with hard wiring. Alternatively, the conversation can be transmitted wirelessly between the back office 112 and stall 114 using radio frequency (RF) technology or digitally encoded wireless networking (e.g., WiFi). In addition to facilitating the conversation between a customer and an employee, the speaker 122 can be used to play audio-based advertising or informational content.

The magnetic card swipe module 130 and radio frequency identification (RFID) module 132 are used to input information into the customer interface 110. The card swipe module 130 is configured to read information from a transaction card with a digitally encoded magnetic strip. The RFID module 132 is configured to read information from an RFID object that includes digitally encoded information. The RFID module 132 and card swipe module 130 are both designed to read payment information or customer loyalty information from a transaction card or loyalty card. Information obtained by the RFID module 132 and card swipe module 130 are transferred to the POS system 116 in the back office 112 by a secure wired or wireless transmission. The card swipe module 130 optionally includes a PIN pad 131 for keying personal identification numbers (PIN), authorization codes or other information into the POS System 116.

The camera 128 is configured to provide visual feedback of the stall 114. In a first preferred embodiment, the camera 128 is configured to detect the presence and absence of a vehicle or customer from the stall 114. The camera 128 is connected to the onboard customer interface computer 134, which is programmed to interpret the visual output from the camera 128. At a fundamental level, the camera 128 and onboard customer interface computer 134 cooperate to provide an accurate indication of whether a vehicle is present in the stall 114 and how long the vehicle has been positioned at the stall.

In a second preferred embodiment, the camera 128 and onboard customer interface computer 134 cooperate to establish the size of the vehicle in the stall 114. The size of the vehicle can be estimated by determining the extent the visual field from the camera 128 changes upon the introduction of a vehicle within the visual field. In yet a third preferred embodiment, the camera 128 is equipped and configured to capture an image of the vehicle or the customer's face. The image of the vehicle and/or customer's face can be recorded and associated with transaction information.

In yet another preferred embodiment, the camera 128 is configured to perform an optical code recognition function. In this additional embodiment, a consumer may present a coupon or graphic to the camera 128 for recognition of the graphically encoded message. As an example, the camera 128 can be programmed to interpret quick response ("QR") codes embedded within print coupons or presented on a consumer's mobile device. The camera 128 feeds the captured image to the onboard customer interface computer 134 for processing and transmission to the main control server 106.

In yet another alternate embodiment, the camera 128 is replaced with, or augmented by, proximity sensors (not separately shown in FIG. 2). The proximity sensors are configured to provide vehicle and consumer detection at the stall 114. In particularly preferred embodiments, the proximity sensors include sonar-based sensors that each include a transmitter and receiver. Suitable sonar proximity sensors are available from Siemens Corporation under the Sonar-BERO brand. As an alternative to the sonar proximity sensors, it may be desirable to implement infrared proximity sensors into the stall 114 to identify the presence of vehicles and consumers. Suitable infrared proximity sensors are available from Silicon Labs.

In addition to coordinating the exchange of information between the various input and output sources provisioned on the customer interface 110, the onboard customer interface computer 134 includes a content storage device 136. The content storage device 136 preferably includes a disk drive, solid state memory or other storage device that is well-suited to reliably store, access and serve advertising and informational content. The onboard customer interface computer 134 is placed in data connectivity with the menu control server 106 through a high bandwidth wired or wireless connection.

An important aspect of the presently preferred embodiments includes the storage of content within the content storage device 136 within the customer interface 110. Rather than feeding content to the customer interface 110 on a real-time, streaming basis, content is preloaded into the content storage device 136. The content is served at the customer interface 110 by the onboard customer interface computer 134 in response to a "trigger" signal delivered by the menu control server 106. In a facility with multiple stalls 114, the simultaneous delivery of rich content from the menu control server 106 to multiple customer interfaces 110 could exceed bandwidth limits. Storing the content locally at each customer interface 110 and using relatively small-sized triggers to control the display of content at the customer interface provides a much more robust delivery system. For example, in a customer interface 110 positioned at a drive-in restaurant stall 114, the content stored within the onboard customer interface computer 134 may include distinct video pieces advertising a limeade drink, a cheeseburger and a customer loyalty program. To push the video advertising the limeade drink at a particular stall 114, the menu control server 106 sends a "limeade ad video" trigger signal to onboard customer interface computer 134 on the selected stall 114. In response, the onboard customer interface computer 134 serves the limeade ad video on the dynamic menu screen 120.

Figure 11:
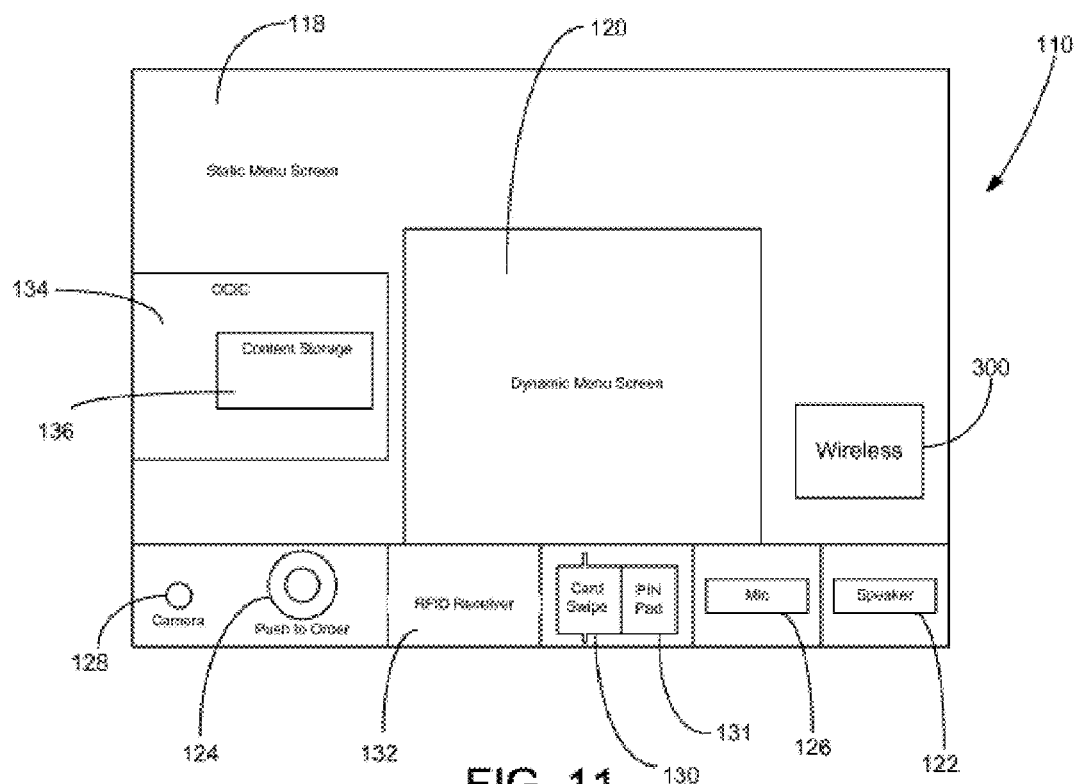
FIG. 11 is a diagrammatic view of an alternate interactive menu from the dynamic menu system of FIG. 1 that includes a wireless radio.

Optionally, as illustrated in FIG. 11, the stall 114 and the onboard customer interface computer 134 include a wireless communication device configured to connect with a consumer's mobile computer device (e.g., mobile phone, tablet or laptop computer) or the consumer's automobile. In a particularly preferred embodiment, the onboard customer interface computer 134 includes a radio device 300 that is configured to communicate wirelessly with the consumer's mobile device or automobile. The radio 300 preferably utilizes one or more standardized communication protocols, such as, WiFi or Bluetooth to permit the transfer of data between the stall 114 and the consumer's mobile device or vehicle.

Figure 12:
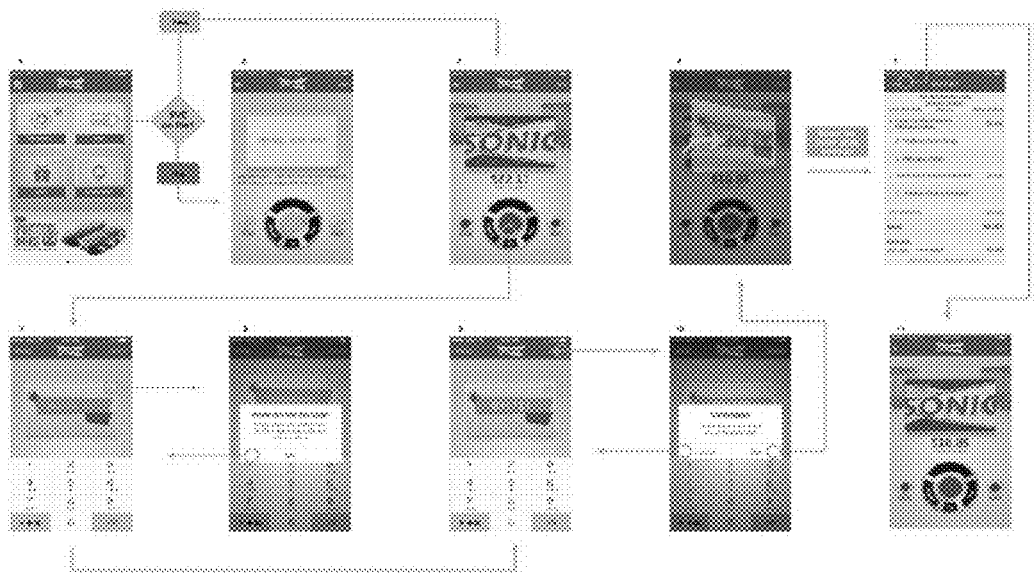
FIG. 12 is a process flow diagram for a mobile device payment routine.

Turning to FIG. 12, shown therein is a graphic process flow diagram illustrating a process for arranging payment using a mobile device. In a first preferred embodiment, the payment process is conducted on the customer's mobile device through an independent data network that is connected to the restaurant's private mobile payment system. More particularly, when the order is placed and priced, the customer has the option of selecting the form of payment. The customer can select payment with a credit card, debit card or loyalty card at the stall 114, providing cash to restaurant, or using the mobile device payment process. If the customer selects the mobile device payment process, a payment code is displayed at the stall 114 to the customer. The payment code is tied to the customer's transaction and is issued by the restaurant's private mobile payment system. The customer can then access the customer's account at the private mobile payment system using the customer's mobile device via an independent data network (e.g., a cellular wireless network) or through a local network with Internet connectivity (e.g., a local WiFi network hosted at the restaurant).

Once connected to the restaurant's private mobile payment system, the customer can enter the payment code and full or partial payment of the order can be made with funds available to the customer in the private mobile payment system. Processing payment through the restaurant's private mobile payment system allows the customer to make payment with a mobile device or any other computer connected to the Internet. The same process allows the restaurant to log orders made by the customer so that relevant marketing materials can be presented to the customer in the future based on past orders. In a particularly preferred embodiment, the private mobile payment system is hosted by a third-party provider that processes the payment between the restaurant and the customer.

In a second alternative preferred embodiment, the payment process is conducted directly between the stall 114 and the customer's mobile device. Before the mobile payment process is started, the consumer pairs the mobile device or vehicle with the wireless radio 300 at the stall 114. To pair the mobile device with the wireless radio 300 at the stall 114, a pairing code is generated by the onboard customer interface computer 134 and displayed at the stall 114. The customer enters the pairing code into the mobile device to complete the pairing operation. Once paired, advertising material (including audio and video), menu information, payment information, awards, rewards or other consumer-directed information can be transferred between the stall 114 and the mobile device or vehicle. In a particularly preferred embodiment, the mobile device includes a client program (or App) that is configured to pair and communicate with the onboard customer interface computer 134 through the wireless radio 300.

In yet another preferred embodiment, the customer's mobile device is paired to the stall 114 through a third-party network. To pair the mobile device through a third-party network, the customer first logs into the client program on the mobile device. A short code is displayed on the dynamic menu screen 120. By entering the short code into the mobile device through the client program, the mobile device connects to the third-party network. The short code is interpreted by the third-party network as an indication of the customer's location (e.g., restaurant and stall). The third-party network can then connect directly to the onboard customer interface computer 134 at the stall 114. Once the third-party network has been connected to the appropriate stall 114 and the customer's mobile device, information can be passed from the stall 114 to the customer's mobile device through the third-party network.

As noted in FIG. 12, when an order has been completed, the onboard customer interface computer 134 transfers the amount due through the wireless radio 300 the paired mobile device or vehicle. The consumer can then use the mobile device or vehicle to make payment for the order. In a particularly preferred embodiment, payment is made by referencing a pre-paid customer loyalty-card. The payment process can be made secure by requiring the use key codes found on the customer loyalty car or other payment form.

Figure 3:
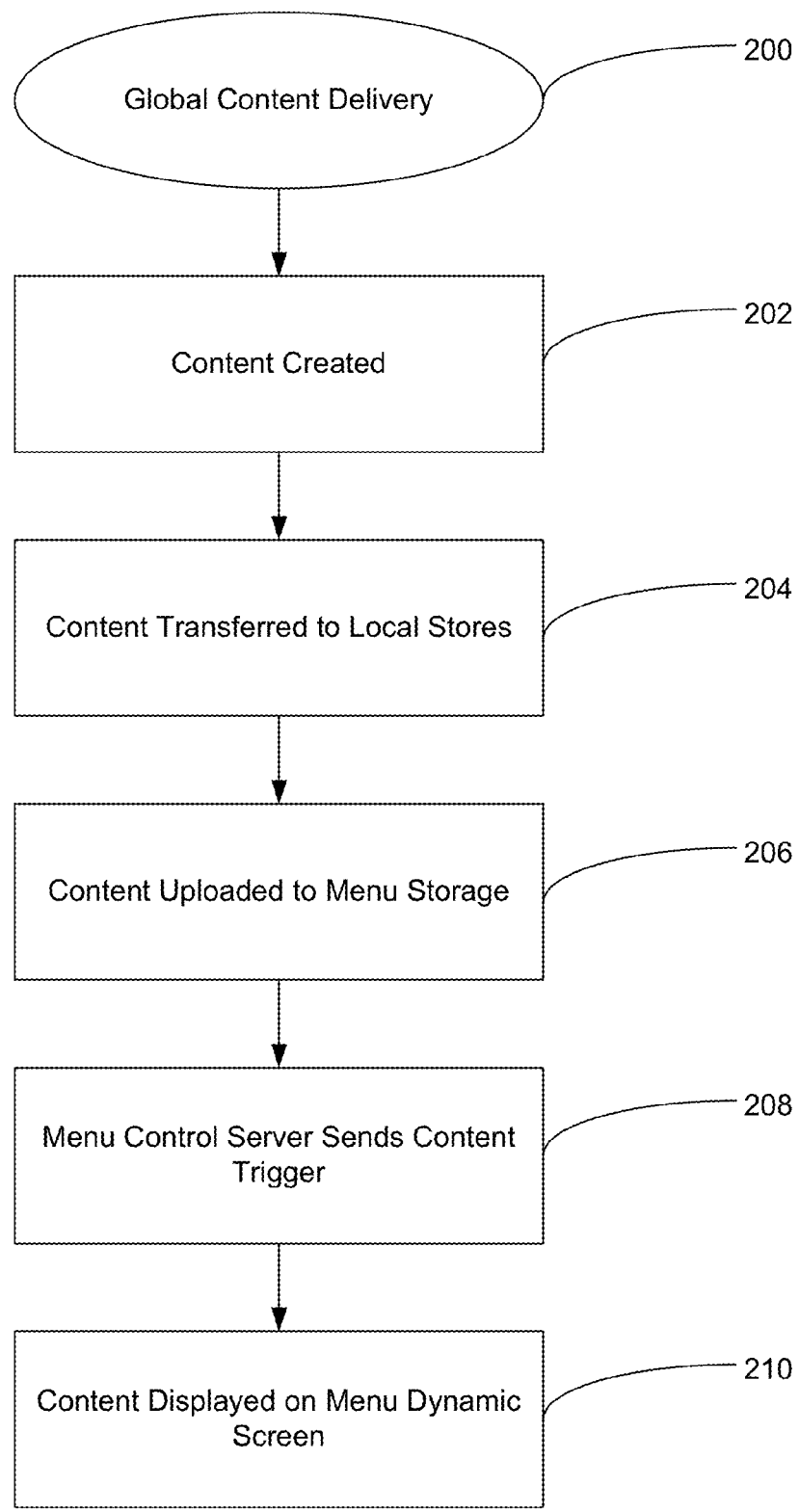
FIG. 3 is a process flow diagram for a global content delivery process.

Turning back to FIG. 3, shown therein is a process flow diagram for a global content delivery process 200 for delivering content to customer interfaces 110 from the central office 102. At step 202, advertising content is created and initially housed at the central office 104. The advertising content may include graphics, video and sound clips stored in an acceptable file format. At step 204, the content is transferred to the menu control server 106 in each of the selected local stores 108. In an alternate preferred embodiment, the content files are provided to the menu control servers 106 together with a delivery instruction file. The delivery instruction file provides each menu control server 106 with logic and display rules that control the initiating of trigger signals to launch the display of the content on the customer interfaces 110. Alternatively, the menu content server 106 at the local stores 108 contact the central office 104 and request updated information. In this alternate embodiment, the local stores 108 "pull" content down from the central office 104 rather than received a "push" of information from the central office 104.

At step 206, the content is transferred from the menu control servers 106 to the content storage devices 136 at the one or more of the customer interfaces 110. In a particularly preferred embodiment, the content is transferred to the content storage devices 136 during off-peak times for bandwidth consumption, such as, for example, while the business is closed.

Once the content has been loaded onto the content storage devices 136, the menu control server 106 selectively sends a content trigger to the onboard customer interface computer 134 at step 208 in response to content delivery logic residing on the menu control server 106. At step 210, the onboard customer interface computer 134 displays the selected content on the customer interface 110 in response to the content trigger signal.

The dynamic menu system 100 can be used to specialize the delivery of content at the stall 114. By loading a variety of content on the onboard customer interface computer 134 and providing for control logic in the menu control server 106, the dynamic menu system 100 can tailor an advertising and entertainment experience for the customer based on a number of historical factors, marketing trends and environmental inputs. The following provides a high-level description of a handful of processes for delivering dynamic content to the customer interface 110.

Figure 4:
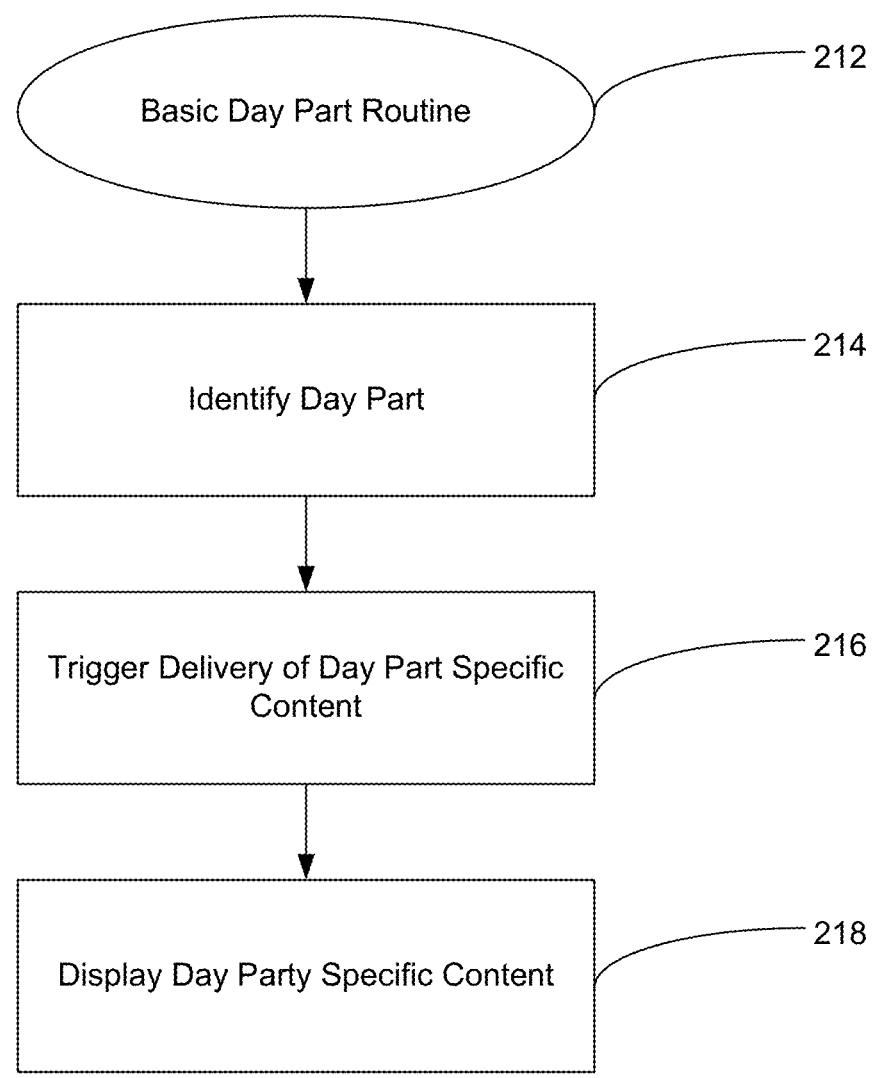
FIG. 4 is a functional diagram of a basic day part process.

Turning to FIG. 4, a basic day part routine 212 provides a method for displaying content on the dynamic menu 120. At step 214, the onboard customer interface computer 134 or menu control server 106 identifies the current time of day. Based on the current time of day, onboard customer interface computer 134 or the menu control server 106 sends at step 216 an appropriate day-part trigger to the customer interface 110. At step 218, the onboard customer interface computer 134 delivers the appropriate day-part content on the dynamic menu screen 120.

Figure 5:
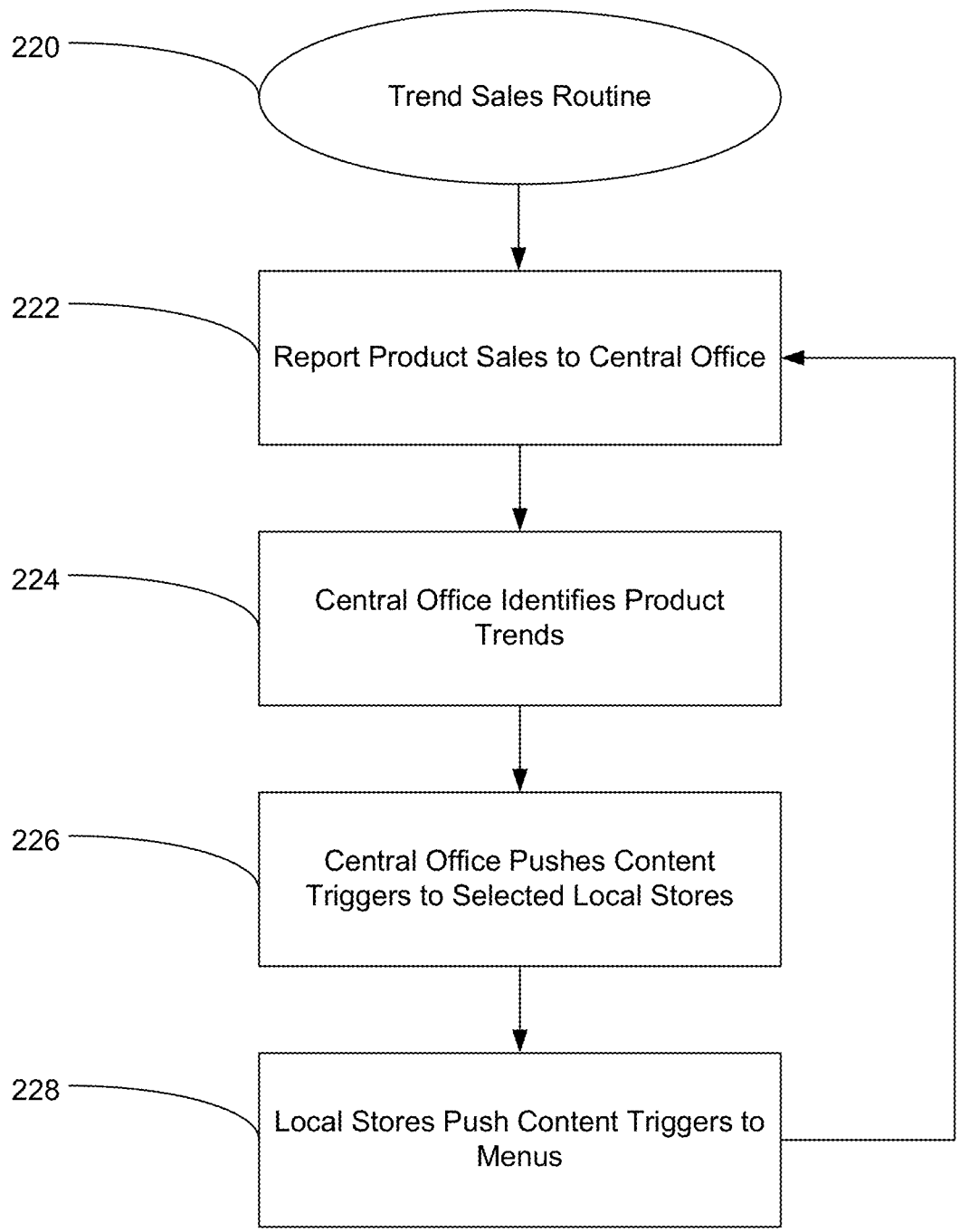
FIG. 5 is a functional diagram of a trend sales routine.

Turning to FIG. 5, shown therein is a process flow diagram for a trend sales routine 220. The trend sales routine 220 provides a mechanism for adjusting marketing content in real-time based on current sales trends. At step 222, the POS system 116 reports current sales information to the central office 102. Based on aggregated sales data from a number of local stores 108, the central office identifies products that are exceeding sales expectations and products that are failing to meet sales predictions. At step 226, the central office distributes content triggers based on the evaluation of current sales reports. At step 228, each of the local stores 108 displays the selected content at the customer interface 110 based on the appropriate trigger. The trend sales routine 220 can be used to encourage lagging sales or take advantage of trending sales in real-time.

Figure 6:
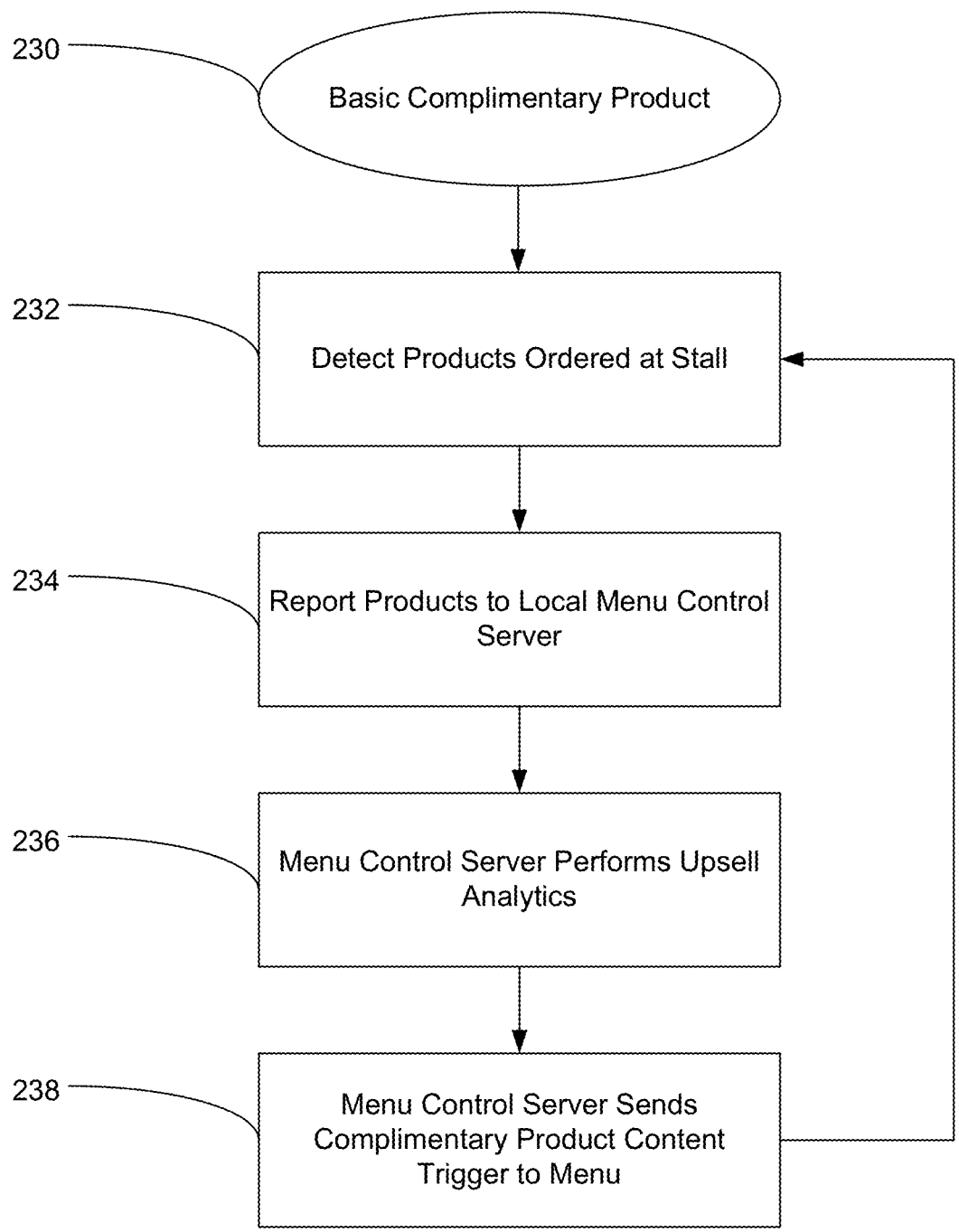
FIG. 6 is a functional diagram of a basic complementary produce routine.

Turning to FIG. 6, shown therein is a process flow diagram for a basic complimentary product process 230. At step 232, the POS system 116 detects an order placed at the stall 114. At step 234, the POS system 116 reports the product sale to the menu control server 106. At step 236, the menu control server calculates a complimentary product based on predefined complimentary product rules or past sales statistics. At step 238, the menu control server 106 issues a content trigger to the customer interface 110 to display the complimentary product content on the dynamic menu screen 120. The process repeats at step 232 as additional products are ordered and the effectiveness of the complimentary product content is evaluated and recorded. Optionally, the complimentary product content is displayed during the order confirmation process rather than as the order is being placed. The results of the complimentary product content routine can be used to establish new rules to be applied at step 236 in future sales opportunities.

Figure 7:
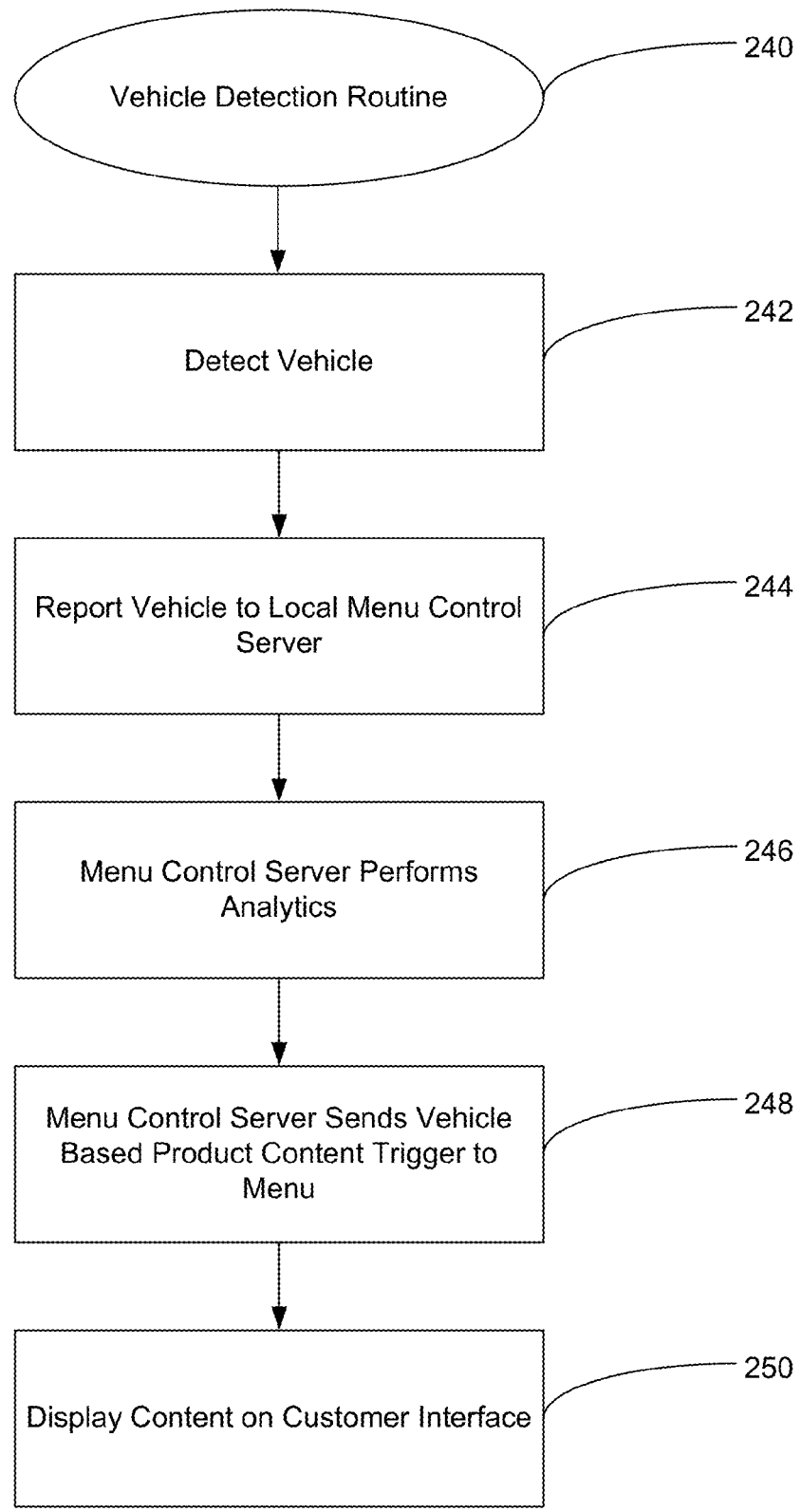
FIG. 7 is a functional diagram of a vehicle detection routine.

Turning to FIG. 7, shown therein is a process flow diagram for a vehicle detection process 240. At step 240, the camera 128 (or other proximity sensor) detects the presence of a vehicle at the stall 114. The detection of the vehicle can be used to trigger the delivery of pre-order information at the stall 114. In addition to initiating the delivery of marketing material at the stall 114, the information presented by the camera 128 or other proximity sensor is used by the onboard customer interface computer 134 to estimate the size of the vehicle. At step 244, the onboard customer interface computer 134 reports the size of the vehicle to the menu control server 106. The menu control server 134 evaluates the size of the vehicle and determines appropriate content based on the size of the vehicle at step 246. For example, the content appropriate for a motorcycle may be different from the content appropriate for a large sport utility vehicle. At step 248, the menu control server 106 issues a trigger for the selected content to the stall 114. At step 250, the onboard customer interface computer 134 at the stall causes the appropriate vehicle-sized content to be displayed at the dynamic menu screen 120.

Figure 8:
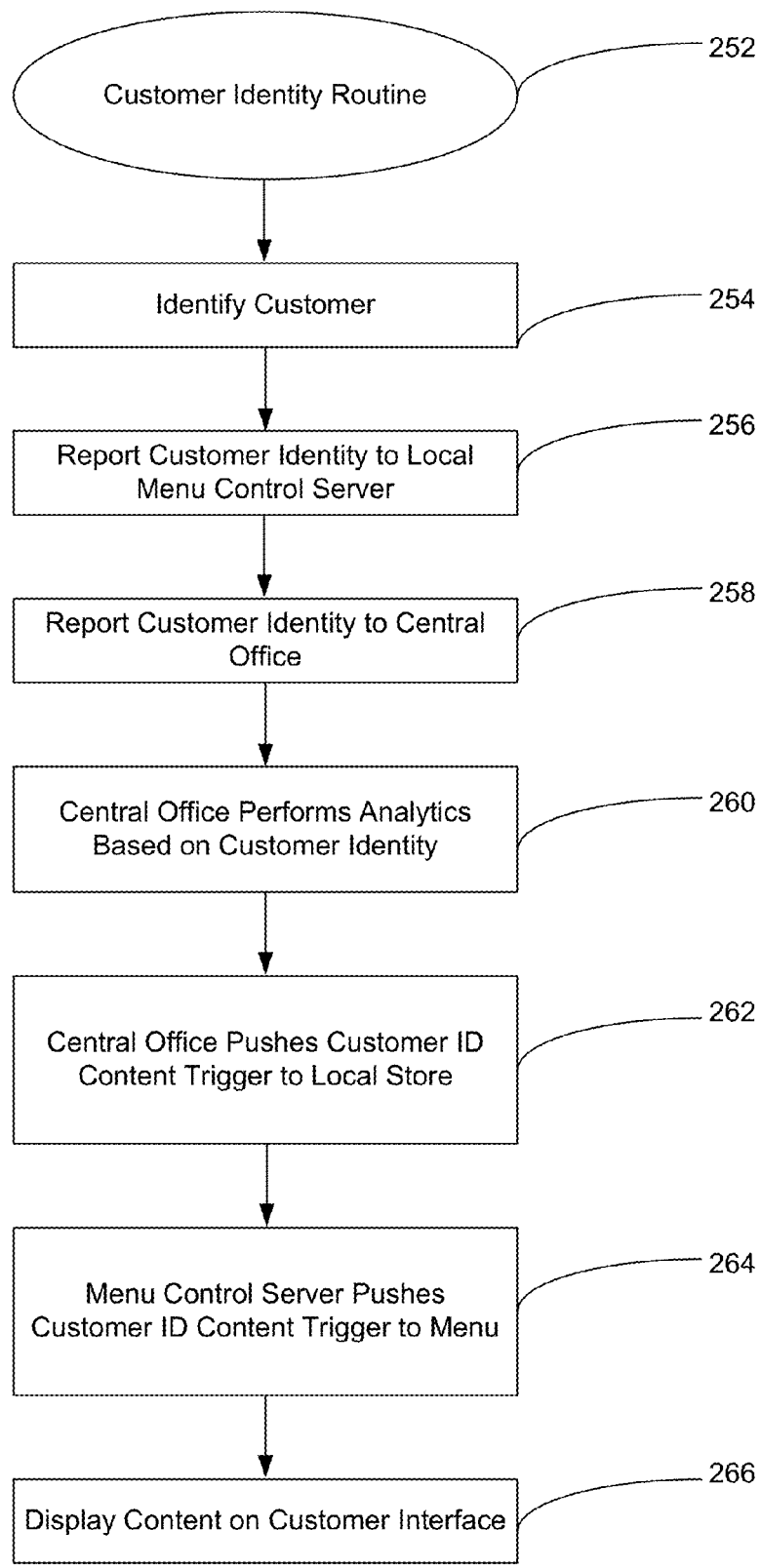
FIG. 8 is a functional diagram of a customer identity routine.

Turning to FIG. 8, shown therein is a process flow diagram for a customer identity routine 252. At step 254, the identity of the customer is established. The identity of the customer can be established by reading a credit card with the magnetic card swipe module 130, inputting the customer's phone number or other number associated with a customer loyalty program, reading an RFID object with the RFID module 132, performing facial recognition using the camera 128, or identifying the vehicle with the camera 128. Once the identity of the customer has been established, the identity of the customer is reported to the menu control server 106 at step 256. The menu control server 106 then reports the customer's identity to the central office 102 at step 258. It will be appreciated that the customer loyalty program will include a database established using information about the customer and the customer's past purchases. The customer loyalty database can be stored at the central office 104 or on a third-party network.

In preferred embodiments, the customer loyalty program will track the customer's past and current order. When the customer identity is sent to the central office 104 or third-party network at step 258, the customer loyalty program will communicate to the dynamic menu system 100 will any rewards that are available to the customer. The dynamic menu system 100 can then display those rewards on the dynamic menu screen 120. The customer may then select the rewards on the dynamic menu screen 120. The award(s) is then automatically transferred to the dynamic menu screen 120 and processed through the POS System 116. Alternatively the award item(s) can be automatically processed through the order in the POS system 116 without a separate visual confirmation on the dynamic menu screen 120.

The dynamic menu system 100 also provides for the ability of customers to enroll into the customer loyalty program. The customer can be prompted to enroll in the customer loyalty program with a visual cue on the dynamic menu screen 120. Using prompts on the dynamic menu screen 120, the customer can enter identifying information necessary for enrollment in the customer loyalty program. The customer's information is then sent to the central office 102 or third-party network for registration into the customer loyalty program.

Based on the customer's identity and sales history and customer profile, sales analytics are performed by the central office 102 at step 260. The analytics may include, for example, a determination of the customer's past orders. At step 262, the central office 102 pushes customer-specific content to the local store 108, where the menu control server provides a trigger to the onboard customer interface computer 134 at the customer's stall at step 264. Finally, at step 266, the onboard customer interface computer 134 displays the customer-specific content on the dynamic display screen 120. The customer identity routine 252 can be used to prompt a particular customer with advertisements for products that the customer has ordered in the past.

Figure 9:
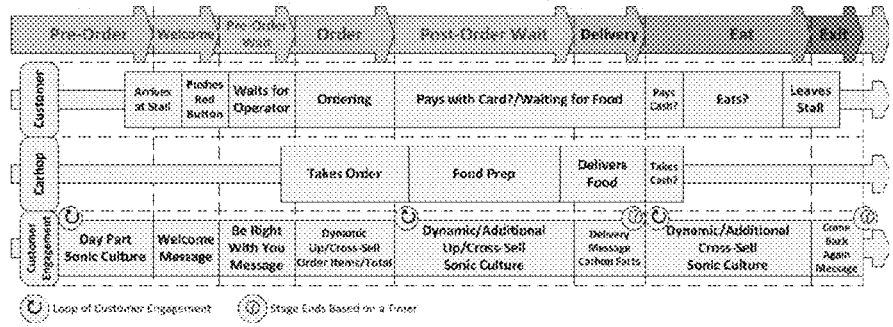
FIG. 9 is a functional diagram of a customer interaction using the dynamic menu system of FIG. 1.
Figure 10:
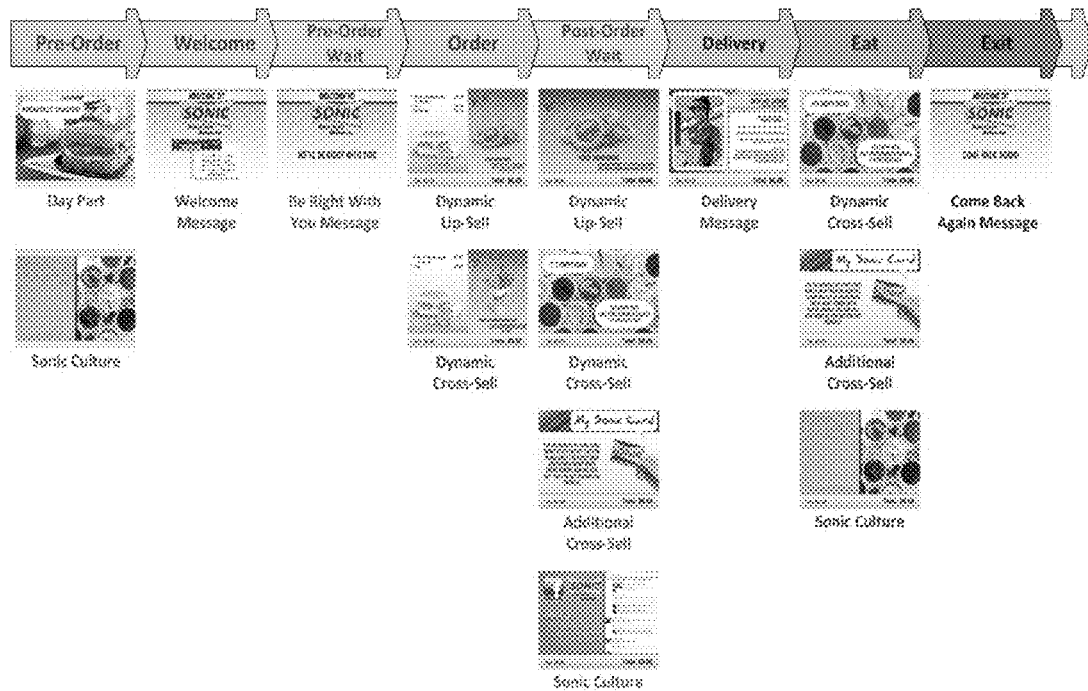
FIG. 10 is a functional diagram of a customer interaction using the dynamic menu system of FIG. 4.

The dynamic menu system 100 can be used to provide specialized advertising and informational content in real-time to enhance the customer experience. As depicted in FIGS. 9 and 10, the use of the dynamic menu system 100 permits the restaurant to make targeted marketing presentations to the customer. FIGS. 9 and 10 illustrate that at every point in the customer's experience at the stall 114, the dynamic menu system 100 provides content to the customer. During the pre-order phase, the menu control server 106 triggers the display of the appropriate day-part advertisement. A welcome message can be displayed during this phase. Once the customer has initiated the ordering process, the dynamic menu screen 120 can be changed to reflect the customer's order for confirmation purposes. Based on the customer's order, the menu control system 106 can be used to initiate a product-based upsell advertisement. The dynamic menu screen 120 can then be updated as the customer's food order is delivered. If the customer stays in the stall 114 to eat, the camera 128 or other proximity sensor provides an indication that the vehicle is still at the stall 114, and the menu control server 106 triggers additional advertisements or entertainment content at the customer interface.

Following the completion of the order or delivery of the order, the customer can be presented with the ability to watch a short video, cartoon or advertisement on the dynamic menu screen 120 or mobile device. In a particularly preferred embodiment, the customer is presented with several media options from which to choose. The dynamic menu system 100 can be configured to present the customer with interactive trivia questions or to solicit feedback from the customer about the ordering experience. This feedback would then be sent to the back office 112 or central office 104 for processing.

The dynamic menu system 100 can also be used to display items trending at the store or a collection of store based on live sales data. For example, the dynamic menu system 100 can present advertising content on the dynamic display screen 120 that indicates which products are currently at the top of the sales rank. Additionally, the dynamic menu system 100 can be configured to display information regarding other customer's recommendations and orders. For example, the dynamic menu system 100 can be configured to display on a first stall 114 information about orders placed at a second stall 114 at the same restaurant. This marketing content can be displayed during the order phase as cross-sell/up-sell suggestions. These suggestions and marketing content may be based on other customers' orders and recommendations or based on pre-defined content. Displaying marketing content based on trending products or products ordered by other customers encourages customers to purchase these products.

Continuing with FIG. 10, during the eat phase of the experience, the customer may be provided with additional advertising content on the dynamic menu screen 120. The content is preferably customized based on the customer's order and the content can be configured to present the customer with offers to incentivize the customer to place another order. For example, the offer may include a discount for a particular item that was not included in the customer's original order.

For the purposes of the present disclosure, the preferred embodiment has been explained with reference to an implementation in a quick-serve restaurant environment that includes a central building and one or more remote locations at which customers are provided service. It will be appreciated, however, that the dynamic menu system 100 may find utility in numerous alternative applications. For example, the dynamic menu system 100 can be used to conduct transactions in a business having one or more drive-through lanes for providing remote customer service.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms expressed herein. It will be appreciated by those skilled in the art that the teachings of the present invention can be applied to other systems or environments without departing from the scope and spirit of the present invention.

What is claimed is:

1. A customer interface system configured to provide dynamic content to the customer, the customer interface system comprising:
    a central office;
    a content control server configured to make content available for distribution; wherein the content control server is located at the central office;
    a local store spaced apart from the central office;
    a plurality of vehicular stalls located around the outside of the local store;
    a customer interface control server; wherein the customer interface control server is located at the local store and wherein the customer interface control server is connected to the content control server;
    a plurality of customer interfaces, wherein each of the plurality of customer interfaces is located at a separate one of the plurality of vehicular stalls and connected to the customer interface control server, wherein each of the customer interfaces comprises an onboard customer interface computer, wherein the onboard customer interface computer includes a content storage device that is configured to store content from the content control server;
    wherein content from the content control server is transmitted to the customer interface control server, where the content is then preloaded into the content storage device in each of the plurality of customer interfaces; and
    wherein content stored at each of the content storage devices is displayed at the corresponding customer interface in response to a content trigger sent from the customer interface control server to the customer interface.

2. The customer interface system of claim 1, wherein the customer interface comprises a menu assembly.

3. The customer interface system of claim 2, wherein the customer interface comprises:
 a video screen;
 a microphone; and
 a speaker.

4. The customer interface system of claim 1, wherein the customer interface further comprises a camera configured to detect the presence of a customer in close proximity to the customer interface system.

5. The customer interface system of claim 1, wherein the customer interface further comprises a proximity sensor configured to detect the presence of a customer in close proximity to the customer interface system.

6. The customer interface system of claim 1, wherein the customer interface further comprises a payment card module configured to accept a payment card from a customer.

7. A method for delivering advertising content from a central office to customer interfaces positioned at a plurality of remote local stores, the method comprising the steps of:
 storing the advertising content on a content control server at the central office;
 transmitting the advertising content from the central office to customer interface control servers at each of the plurality of remote local stores;
 transferring the advertising content from the customer interface control servers to each of the customer interfaces and preloading the advertising content on content storage devices located in each of the customer interfaces, wherein each of the customer interfaces is located at a vehicular stall located outside one of the local stores;
 sending a content trigger from the customer interface control server to the customer interface; and
 displaying the advertising content at the customer interface in response to the content trigger.

8. The method of delivering advertising content of claim 7, wherein the step of sending a content trigger further comprises sending a content trigger based on the time of day.

9. The method of delivering advertising content of claim 7, wherein the step of sending a content trigger further comprises sending a content trigger based on the identify of a customer near the customer interface.

10. The method of delivering advertising content of claim 7, wherein the method further comprises the steps of:
 detecting the presence of a customer at the customer interface; and
 sending a content trigger based on the detected presence of customer at the customer interface.

11. The method of delivering advertising content of claim 10, wherein the step of detecting the presence of a customer at the customer interface further comprises using a camera to visually identify a customer at the customer interface.

12. The method of delivering advertising content of claim 10, wherein the step of detecting the presence of a customer at the customer interface further comprises using a sonar module to detect the presence of a customer at the customer interface.

13. The method of delivering advertising content of claim 7, further comprising the step of connecting a customer's mobile device through a wireless protocol to the customer interface.

14. The method of delivering advertising content of claim 13, further comprising the step of transferring advertising content from the customer interface to the customer's mobile device.

* * * * *